UNITED STATES PATENT OFFICE.

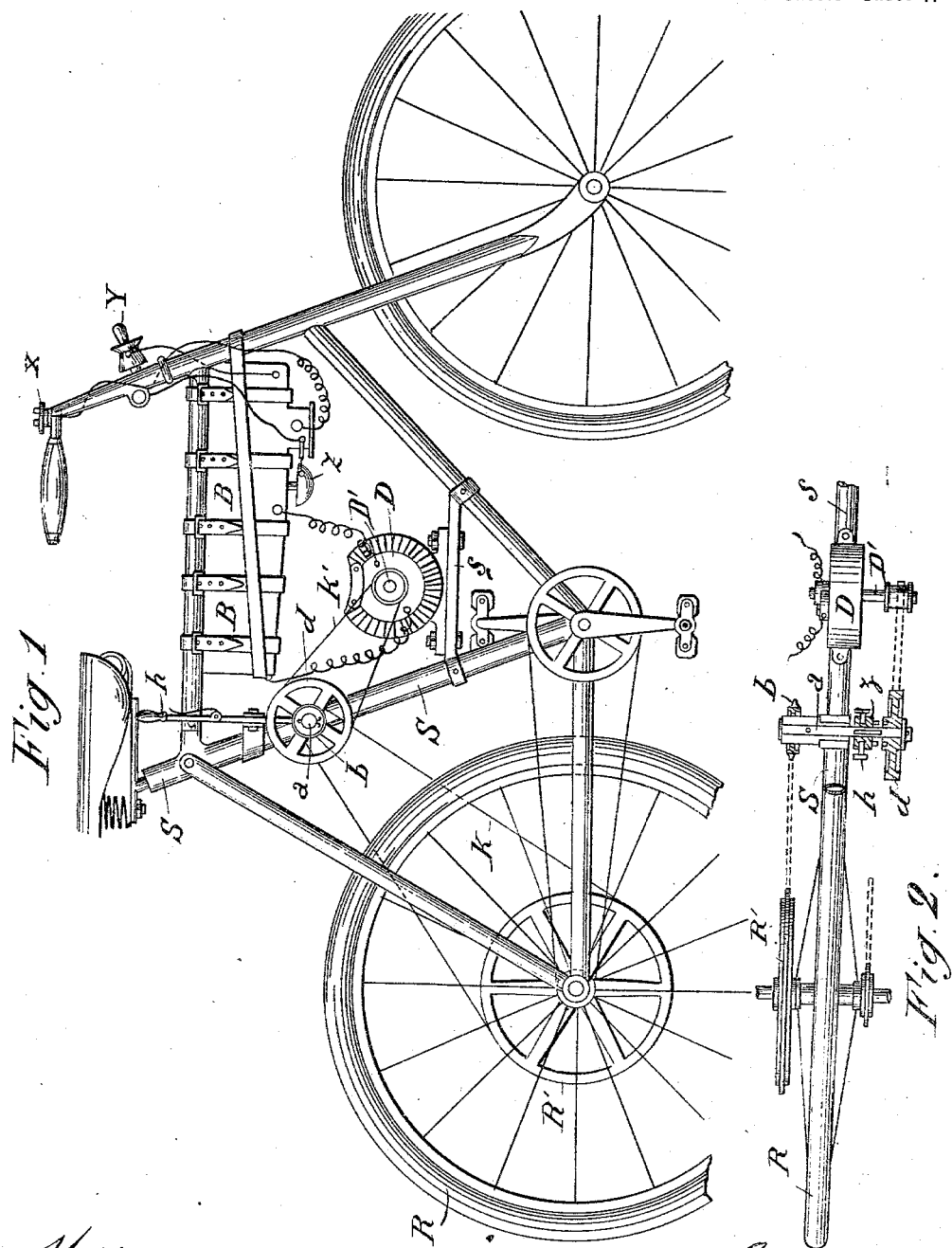

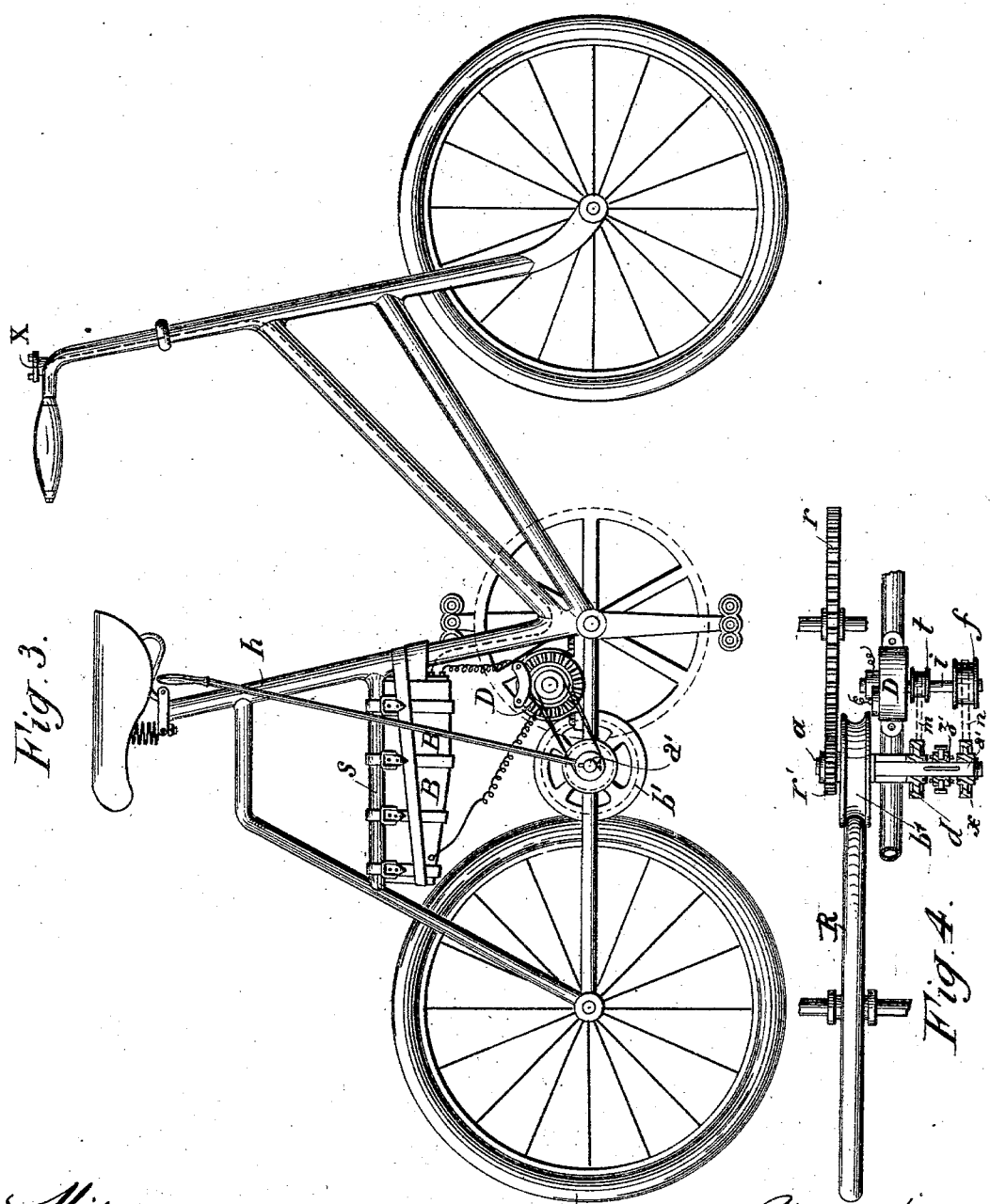

ALBERT HÄNSEL, OF ZEITZ, GERMANY.

ELECTRIC BICYCLE.

SPECIFICATION forming part of Letters Patent No. 656,323, dated August 21, 1900.

Application filed February 1, 1899. Serial No. 704,094. (No model.)

*To all whom it may concern:*

Be it known that I, ALBERT HÄNSEL, a citizen of the Empire of Germany, residing at Zeitz, Germany, have invented certain new and useful Improvements in Electric Bicycles, of which the following is a specification.

This invention relates to bicycles, velocipedes, or similar vehicles, but more particularly to driving means therefor, the object being to provide a driving mechanism which may be easily applied to such vehicles, and in its complete form comprises an electric motor supported by the frame of the bicycle and mechanically connected with the drive-wheel thereof and a storage battery to be charged from said motor as the bicycle runs down a descent, said storage battery being intended to supply current or electromotive force to said motor for actuating the bicycle when hill-climbing, and suitable clutch and switch devices to enable the rider to readily cut in and out the required parts, as more fully and clearly pointed out and claimed hereinafter.

In order that my invention may be the more readily understood and carried into practical effect, I have illustrated the same in the accompanying drawings as applied to an ordinary bicycle and to a lady's machine.

In the drawings, Figure 1 is a side elevation of a bicycle provided with my improvements. Fig. 2 is a broken plan view of the driving mechanism thereof. Fig. 3 is a side elevation of a lady's machine constructed in accordance with my invention, and Fig. 4 is a broken plan view of same.

In the drawings like letters refer to like parts throughout all the figures.

The improved bicycle shown in Fig. 1 resembles the ordinary machines as to the outer appearance thereof, except that the frame of said bicycle is provided with intermediary bars $s$ to support a suitable electric motor D, specially constructed for the purpose. The upper tube of the bicycle-frame carries a storage battery B, removably secured thereto in any suitable way and serving to store the force produced by the electric motor and to restore such force afterward according to need. The diagonal brace-tube S is provided with suitable bearings to receive a shaft $a$, one end of which carries a sprocket-wheel $b$, a belt-pulley $d$ being loosely mounted on the other end of said shaft and which may be readily thrown into engagement with or keyed on said journal by suitably actuating the lever $h$ of clutch device $z$ in order to rotate with the same. The sprocket-wheel $b$ is connected, by means of chain K, with a suitably-constructed wheel R', preferably made of aluminium and keyed on the axle of drive-wheel R, and pulley $d$ is connected, by means of a cord, a belt, or the like K', with the electric-motor shaft D'. (See Figs. 1 and 2.) The bicycle being thus constructed, the rider may actuate his machine either in pedaling as usual when running over a level or in employing the electric motor as a brake when running over an incline or descent, whereby the storage battery will be charged or cause said storage battery to supply current to the electric motor when hill-climbing to add the motive force thus produced to that already due to the strain of the rider. As it is desired to actuate the electric motor D, and thereby produce electromotive force to lie stored for subsequent use, the rider has but to operate lever $h$ to throw pulley $d$ in engagement with journal $a$, whereby the rotations imparted to sprocket $b$ by wheel R' will be transmitted to the motor-shaft D and the current thus produced caused to pass into said storage battery by actuating a suitable switch, which may be arranged on the handle-bar of the bicycle, as indicated by letter X in Fig. 1. Thus the electric motor will act as a brake, and the force which was hitherto lost by braking or back-pedaling will be suitably transformed and stored, as described. The pulley $d$ being again disengaged from journal $a$ (by actuating lever $h$) and the storage battery cut out by switch X, the electric motor will again be inoperative. In hill-climbing the circuit of the electric motor and the battery will again be closed and its current supplied to the electric motor. The battery B may also be employed to maintain an electric lamp Y and a bell Z or the like, as desired.

The embodiment shown in Figs. 3 and 4 of the accompanying drawings and applied to a lady's machine is slightly modified in that the storage battery B is removably secured to a supplemental brace $s$ of the frame, the electric motor D being supported on the lower fork of said frame and the driving mechanism being constructed and arranged without the usual sprocket-wheels and chain. The drive-wheel R of the machine engages a suitably-grooved wheel $b'$, journaled in the lower fork of the frame and the shaft $a'$ of which carries a pulley $d'$ near said wheel $b'$ and a second similar pulley $x$ at the end thereof, said pulleys $d'$ and $x$ being loosely mounted on said shaft. The motor-shaft $D'$ carries two pulleys $t$ and $f$, secured thereto, the smaller, $t$, of which is located in front and connected by belt $m$ with pulley $d'$, the larger pulley $f$ being in front and connected with pulley $x$ by belt N. Between loose pulleys $d'$ and $x$ and mounted on shaft $a'$ I have provided a suitable clutch device $z'$, adapted to key either pulley $d'$ or pulley $x$ on shaft $a'$ by actuating-lever $h$ to impart motion to the electric motor, the intermediary position of said clutch device $z'$ corresponding to the rest of said motor. As will be seen from the drawings Figs. 3 and 4, the movement of the pedals will be transmitted to wheel $b'$, and therefore to the drive-wheel $R^2$ of the machine, through the agency of gear-wheel $r$, secured to the crank-axle and meshing with gear-wheel $r'$, secured to shaft $a'$. The peculiar arrangement of the driving mechanism and the double connection of pulleys $d'$ with $t$ and $x$ with $f$ allow of increasing or decreasing the rate of speed of the electric motor.

I wish it to be understood that I do not confine myself to the precise construction and arrangement of the parts as shown in the accompanying drawings, so long as the peculiar features of my invention be retained.

Having fully described my invention, what I claim, and desire to secure by Letters Patent, is—

1. In a bicycle or like vehicle, the combination with the frame, of an electric motor and a storage battery secured to said frame, a shaft mounted on the frame, gearing for transmitting rotation of the drive-wheel to said shaft, gearing between the shaft of the electric motor and the aforesaid shaft, and means for throwing the shaft of the motor into and out of gear with the other shaft.

2. In a bicycle or like vehicle, the combination with the bicycle-frame, of an electric motor and a storage battery suitably secured to said frame, and means for directly actuating said electric motor by the movement of the drive-wheel of the machine, substantially as set forth.

3. In a bicycle or like vehicle, the combination with the bicycle-frame, of an electric motor and a storage battery supported on said frame, a gear-wheel secured on the pedal-axle and meshing with a toothed pinion secured on a shaft mounted on the lower fork of the bicycle and carrying a suitably-grooved wheel engaging the drive-wheel of the machine, said shaft furthermore carrying two loose pulleys connected with two suitable pulleys of different diameters secured on the motor-shaft of the electric motor, and means for readily engaging and disengaging said loose pulleys with said journal at any desired moment, substantially as set forth and for the purpose specified.

In testimony whereof I have hereunto set my hand in the presence of two subscribing witnesses.

ALBERT HÄNSEL.

Witnesses:
RUDOLPH FRICKE,
WILLIAM HEFFLER.